(12) United States Patent
Goldstein (10) Patent No.: US 10,382,568 B2
(45) Date of Patent: Aug. 13, 2019

(54) DISPLAY OF CALENDAR-BASED SINGLE USER, SINGLE EVENT TRAVEL OPTIONS

(71) Applicant: Hipmunk, Inc., San Francisco, CA (US)

(72) Inventor: Adam Julian Goldstein, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 127 days.

(21) Appl. No.: 15/235,954

(22) Filed: Aug. 12, 2016

(65) Prior Publication Data

US 2017/0180488 A1  Jun. 22, 2017

Related U.S. Application Data

(60) Provisional application No. 62/269,772, filed on Dec. 18, 2015.

(51) Int. Cl.
*H04L 29/08* (2006.01)
*G06F 16/2457* (2019.01)
(Continued)

(52) U.S. Cl.
CPC ............ *H04L 67/16* (2013.01); *G06F 3/0482* (2013.01); *G06F 3/0484* (2013.01); *G06F 9/542* (2013.01);
(Continued)

(58) Field of Classification Search
CPC ..... H04L 67/16; G06F 3/0482; G06F 3/0484; G06F 9/542; G06F 17/3053; G06Q 10/1093
(Continued)

(56) References Cited

U.S. PATENT DOCUMENTS 7,769,611 B1 * 8/2010 Rodriguez ............. G06Q 10/02
  705/7.11
9,098,866 B1 * 8/2015 Gurin ................... G06Q 10/109
(Continued)

FOREIGN PATENT DOCUMENTS

WO    2017106635    6/2017

OTHER PUBLICATIONS

"International Application Serial No. PCT/US2016/067156, International Search Report dated Apr. 27, 2017", 2 pgs.
(Continued)

*Primary Examiner* — Michael Won
(74) *Attorney, Agent, or Firm* — Schwegman Lundberg & Woessner, P.A.

(57) ABSTRACT

Example embodiments provide a system and method for providing user interfaces comprising calendar-based suggestions of single user, single event travel options. The system accesses calendar data of the user, which indicates an event that the user is scheduled to attend, and extracts data for the event from the calendar data. The system constructs an application program interface (API) request by incorporating the extracted data for the event as one or more search criteria in the API request. The system transmits the API request to a provider server of at least one service provider. In response, the system receives results from the provider server(s), which comprise options determined to be compatible with the event based on the one or more search criteria in the API request. The system causes presentation of at least some of the options from the results determined to be compatible with the event.

20 Claims, 6 Drawing Sheets

(51) Int. Cl.
*G06F 3/0482* (2013.01)
*G06F 9/54* (2006.01)
*G06F 3/0484* (2013.01)
*G06Q 10/10* (2012.01)

(52) U.S. Cl.
CPC ... *G06F 16/24578* (2019.01); *G06Q 10/1093* (2013.01)

(58) Field of Classification Search
USPC .................... 709/203, 204, 213, 217, 226
See application file for complete search history.

(56) References Cited

U.S. PATENT DOCUMENTS

| | | | |
|---|---|---|---|
| 2002/0131565 A1* | 9/2002 | Scheuring | G06Q 10/109 379/88.19 |
| 2003/0023463 A1* | 1/2003 | Dombroski | G06Q 10/02 705/5 |
| 2004/0078252 A1* | 4/2004 | Daughtrey | G06F 17/30398 705/5 |
| 2004/0252197 A1* | 12/2004 | Fraley | H04N 5/23203 348/207.1 |
| 2007/0143399 A1* | 6/2007 | Qi | G06Q 10/06311 709/204 |
| 2008/0016442 A1* | 1/2008 | Khoo | G06Q 30/02 715/700 |
| 2008/0167937 A1* | 7/2008 | Coughlin | G01C 21/20 705/7.16 |
| 2008/0201178 A1* | 8/2008 | Vizitei | G06F 17/30867 705/5 |
| 2008/0275941 A1* | 11/2008 | Shekar | H04M 3/4217 709/203 |
| 2008/0281858 A1* | 11/2008 | Aleksiejczyk | G06F 17/30241 |
| 2009/0153353 A1* | 6/2009 | Adams | G06Q 10/109 340/6.1 |
| 2009/0210262 A1* | 8/2009 | Rines | G06Q 10/02 705/5 |
| 2009/0319319 A1* | 12/2009 | Oral | G06Q 10/109 705/7.18 |
| 2011/0125545 A1* | 5/2011 | Lehmann | G06Q 10/06314 705/7.24 |
| 2011/0195727 A1* | 8/2011 | Proulx | G06Q 10/109 455/456.3 |
| 2011/0257881 A1* | 10/2011 | Chen | G01C 21/362 701/465 |
| 2011/0307280 A1* | 12/2011 | Mandelbaum | G06Q 10/025 705/6 |
| 2013/0290060 A1 | 10/2013 | Gupta et al. | |
| 2014/0012619 A1* | 1/2014 | Natarajan | H04L 51/32 705/7.19 |
| 2014/0058884 A1 | 2/2014 | Goldstein et al. | |
| 2014/0172483 A1* | 6/2014 | Bellers | G06Q 10/1095 705/7.16 |
| 2015/0024784 A1 | 1/2015 | Bellver et al. | |
| 2015/0032484 A1* | 1/2015 | Mermelstein | G06Q 10/02 705/5 |
| 2015/0199651 A1* | 7/2015 | Raman | G06Q 10/1095 705/7.19 |
| 2015/0371155 A1* | 12/2015 | Saint-Just | G06Q 10/02 705/5 |
| 2016/0217432 A1* | 7/2016 | Yavor | G06Q 10/1093 |
| 2016/0314429 A1* | 10/2016 | Gillen | G01S 19/13 |
| 2016/0321278 A1* | 11/2016 | Naqvi | G06F 17/30631 |
| 2017/0097939 A1* | 4/2017 | Zhu | G06F 17/3097 |
| 2017/0178081 A1* | 6/2017 | Goldstein | G06Q 10/1095 |
| 2017/0178258 A1* | 6/2017 | Goldstein | G06Q 10/02 |

OTHER PUBLICATIONS

"International Application Serial No. PCT/US2016/067156, Written Opinion dated Apr. 27, 2017", 4 pgs.

* cited by examiner

DISPLAY OF CALENDAR-BASED SINGLE USER, SINGLE EVENT TRAVEL OPTIONS

CROSS REFERENCE TO RELATED APPLICATION

The present application claims the priority benefit of U.S. Provisional Patent Application Serial No. 62/269,772 filed on Dec. 18, 2015 and entitled "Calendar-Based Single Customer, Single Event Travel Options," which is incorporated herein by reference in its entirety.

TECHNICAL FIELD

The subject matter disclosed herein generally relates to machines configured to the technical field of special-purpose machines that facilitate provisioning of user interfaces or webpages comprising customized information based on stored data including computerized variants of such special-purpose machines and improvements to such variants, and to the technologies by which such special-purpose machines become improved compared to other special-purpose machines that facilitate provisioning of user interfaces or webpages comprising customized information. Specifically, the present disclosure addresses systems and methods to cause presentation of user interfaces or webpages that provide calendar-based suggestions of single user, single event travel options.

BACKGROUND

An online service may allow a user of the online service to view multiple options for travel plans and make a selection from the multiple options based on manual user inputs. For example, an airline may operate a webpage that provides an online reservation service from which a user may manually search for available flights (e.g., from San Francisco to New York) on a particular day and then select one of the available flights for reserving a seat thereon. As another example, a hotel may operate a webpage that provides an online reservation service from which the user may manually search for available hotel properties and room types (e.g., in New York) for a particular period of time (e.g., September 5 through September 9) and then select one of the available room types at an available hotel property for reserving. As a further example, a restaurant may offer a webpage that provides an online reservation service from which the user may manually search for available table reservations (e.g., at a popular restaurant) within a particular range of times (e.g., 5:30 PM to 7:30 PM) on a particular date and then select one of the available table reservations for reserving. In all of these instances, the user must be proactive in visiting different websites and entering search criteria in order to compare and select different types of options (e.g., flight, car, hotel, restaurant reservations).

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate generating and provisioning of user interfaces (e.g., web pages) comprising calendar-based suggestion of single user (e.g., one customer or one traveler), single event travel options, and example systems (e.g., special-purpose machines) are configured to generate and provision user interfaces comprising calendar-based suggestion of single user, single event travel options. In particular, example embodiments provide mechanisms and logic that determines options to be presented on one or more user interfaces and causes the user interfaces to be presented to a user. More specifically, calendar-based suggestions of single user, single event travel options presented on the user interfaces involves displaying suggested travel options derived from a single event stored in a calendar of the user (e.g., a customer or a traveler). Accordingly, a suggestion server accesses (e.g., receives or retrieves) calendar data of the user, and extracts (e.g. parses) particular data from the calendar data (e.g., a location of the event or a time of the event). A determination is made, from the extracted data, that a single out-of-town event is calendared for the user. In response to this determination, the extracted data is then made available to service providers (e.g., servers of the service providers), via an application program interface (API) request (e.g., an API call), for available travel options. In some embodiments, the travel options may include special discounts, special inventories, or special extras (e.g., upgrades, free breakfast, parking, or meals included) based on (e.g., in response to) the extracted calendar data, user preferences, preferences of other similar users, or any suitable combination thereof.

As an example, a user in San Francisco may be scheduled for a dinner in an expensive restaurant in downtown Chicago on Monday night. The suggestion server is configured to access calendar data of the user, where the calendar data indicates the scheduled dinner, and use at least some of the calendar data (also referred to as "extracted data") to construct a search, via an application program interface (API) request (e.g., an API call), for available travel options (e.g., a high end hotel near the restaurant in Chicago, since the user is likely an affluent user based on the restaurant the user will be dining at). The search can be automatically triggered by the suggestion server detecting that the calendared event (e.g., the dinner) is in a location a threshold distance from the user's home location and particular travel options (e.g., hotel, flights) have not yet been booked (e.g., not present on the calendar of the user).

In one example embodiment, the extracted data is shared with the service providers (e.g., servers of the service providers) at a specific level. For example, the API request comprises fields for entry, by the suggestion server, of a last event of a day. The fields may include an event type field and a location field (e.g., latitude/longitude, neighborhood, or city) such that the service provider knows that the user is in a particular location and performing some action (e.g., eating at a restaurant, going to a meeting, going to a sports event). In response, the service provider can provide options (e.g., hotel room options), via a user interface, near the particular location of the calendared event. The options may comprise options from multiple service providers aggregated by the suggestion server. As such, the suggestion server may make multiple API calls to servers of different service providers and aggregate a plurality of results from different service providers, and provide a user interface that comprises the plurality of results or a subset of the plurality of results (e.g., curated, top results).

In an alternative example embodiment, the suggestion server can use artificial intelligence, machine-learning, and data processing algorithms to determine a likely interest level of each user for a particular type or level of service (e.g., 5 star hotel versus a 3 star hotel). For example, if the suggestion server detects a user is going to a meeting in a fancy building in downtown Chicago (e.g., based on available information on neighborhood, zip code, star rating, owner, or tenant) and then going to a dinner in a fancy restaurant (e.g., based on reviews or star rating), the suggestion server infers that the user is probably on an expense account or likely affluent. Thus, the suggestion server can infer whether a particular user is likely extremely affluent, moderately affluent, a budget travel, and so forth based on the extracted data. A more affluent user is more likely to prefer, for example, luxury hotel options, business class flights options, and car service options. As another example, a user traveling to Disney World could be more likely to be interested in hotels with family-friendly amenities. Accordingly, the suggestion server can proactively offer suggestions to the service providers as to a type or level of travel option to return in their results (e.g., 5 star hotels, first class airline seat, or family-friendly resort).

Whether the service provider returns customized results (e.g., customized to the anticipated type or level of travel option preferred by the user) or general results (e.g., same results to any user running a general search), the suggestion server takes the results and determines best travel options for the user. For example, the suggestion server connects with Hotel1 and Hotel2. Hotel1 has a sophisticated search system in which if Hotel1 knows the last meeting time and location and that the user is affluent, the search system of Hotel1 has logic to only return the nicest rooms and higher upgrades in their results. On the flip side, Hotel2 only connects using their standard API and returns general results that are not customized to the user. The suggestion server analyzes the search results and derives a result set that is relevant to the user (e.g., based on explicit and inferred preferences). For example, the search results are weighed, sorted, and ranked, and a top number of travel options are provided to the user. Alternatively, all search results can be provided with top travel options highlighted or otherwise differentiated.

The suggestion server is configured to present this result set of travel options to the user (e.g., as suggestions for making a hotel reservation) in one or more user interfaces. For example, when the user visits a website associated with the suggestion server, the result set of travels options will be presented in one or more customized user interfaces. In other example embodiments, a notification or message is sent to the user providing the result set or indicating that result set is available for viewing on the website and providing a link to the web site and the customized user interfaces.

As used herein, a "travel option" is an option (e.g., choice, offering, alternative, menu item, or special deal) of potential interest to a user (e.g., as a user of an online service) in making or executing a travel plan (e.g., an itinerary). A travel option may be a "transportation option" pertinent to a transportation service or a vehicle. Examples of transportation options include travel by airplane, train, bus, trolley, ferry, ship, taxicab, rental car, car sharing service, or any suitable combination thereof. Transportation options may include transportation services (e.g., passenger service) provided by commercial carriers (e.g., airlines, car rental companies, or cruise operators), public transportation (e.g., city buses or regional trains), private operators (e.g., limousine services, charter airplanes, or charter helicopters), or any combination thereof. In some example embodiments, the transportation option specifies that the traveler walk, jog, hike, or ride a bicycle to a particular destination. A travel option may be an "accommodation option" pertinent to an accommodation (e.g., hospitality) service. Examples of accommodation options include stays in a hotel, motel, resort, hostel, bed-and-breakfast inn, boarding house, vacation rental, home sharing service, campground, or any suitable combination thereof. Further examples of accommodation options include reservations at a restaurant, conference facility, health facility (e.g., spa, salon, or massage studio), athletic facility (e.g., gym, pool, or fitness center), or entertainment venue (e.g., theater, sports stadium, amusement park, or museum). In some situations, a travel option may be both a transportation option and an accommodation option (e.g., a compartment in a passenger train, a cabin on a cruise ship, or a bed on an overnight airline flight). A further example of a travel option is trip insurance (e.g., an insurance policy for a set of transportation options, accommodation options, or both).

As a result, one or more of the methodologies described herein facilitate solving the technical problem of providing user interfaces presenting customized information from multiple service providers. The methodologies include accessing calendar data of a user. The logic also extracts data for an event from the calendar data and uses the extracted data to make a determination as to whether the event is, for example, an in-town event, a single out-of-town event, or a part of a trip that includes multiple events. Based on the determination, the extracted data is used to construct an application program interface (API) request, whereby the extracted data is used as, or is associated with, one or more search criteria in the API request. The API request is transmitted to one or more service providers (e.g., to a server of each service provider), and results compatible with the event are received in response to the API request. The logic constructs a user interface comprising at least some options from the results and causes the user interface to be presented to a device of the user. As such, one or more of the methodologies described herein may obviate a need for certain efforts or resources that otherwise would be involved in a user having to navigate to a plurality of service providers (e.g., the user is retained from navigating away from a website of an entity comprising the suggestion server) and performing numerous searches at each service provider in order to determine different travel options. As a result, resources used by one or more machines, databases, or devices (e.g., within the environment) may be reduced, and the user is retained at the website of the entity having the suggestion server. Examples of such computing resources include processor cycles, network traffic, memory usage, data storage capacity, power consumption, network bandwidth, and cooling capacity.

Figure 1:
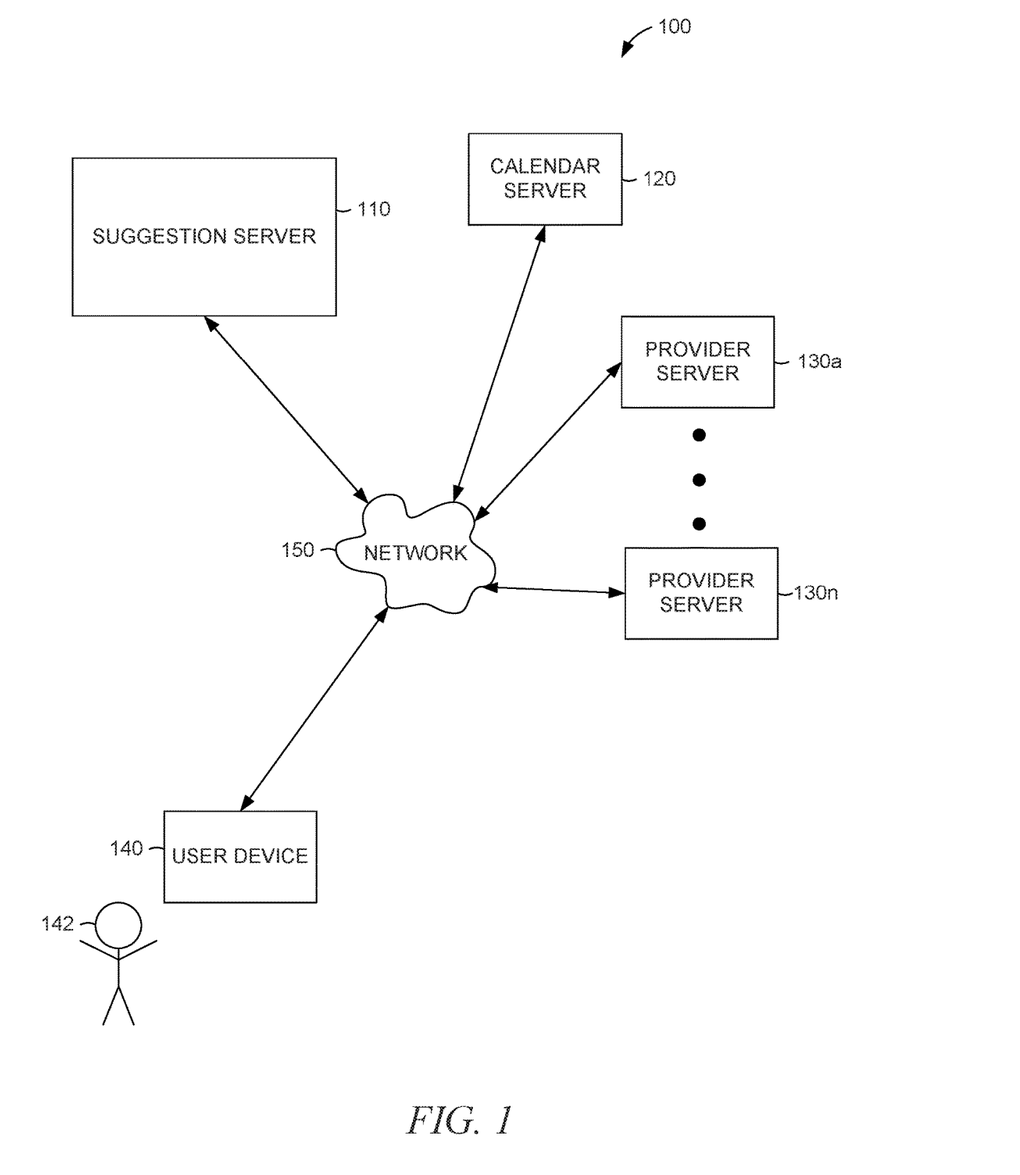
FIG. 1 is a network diagram illustrating a network environment suitable for calendar-based suggestion of single user, single event travel options, according to some example embodiments.

FIG. 1 is a network diagram illustrating a network environment 100 suitable for generating and presenting user interfaces comprising calendar-based suggestions of single user, single event travel options, according to some example embodiments. The network environment 100 includes a suggestion server 110, a calendar server 120, one or more provider servers 130a-130n (collectively referred to as provider server 130), and a user device 140, all communicatively coupled to each other via a network 150. In some example embodiments, the suggestion server 110 and the calendar server 120 may form all or part of a calendar service system that provides calendar-related services to one or more users (e.g., event scheduling or project management). In certain example embodiments, the suggestion server 110 and the provider server 130 may form all or part of a travel service system that provides travel-related services to one or more users (e.g., merchandising of travel options or itinerary management). In various example embodiments, the suggestion server 110, the calendar server 120, and the provider server 130 form all or part of a combined system. The suggestion server 110 is described in more detail in connection with FIG. 2, and may be implemented in a computer system, as described below with respect to FIG. 6.

The calendar server 120 functions as a data repository that stores calendar data of one or more users. In some example embodiments, the calendar server 120 is operated by a third-party calendar service (e.g., Google, Outlook, or Yahoo).

The provider server 130 functions as a data repository that stores travel data describing one or more travel options. In certain example embodiments, the provider server 130 is operated by a third-party travel service provider (e.g., a travel agency, an airline, or a hotel management company). In some example embodiments, the provider server 130 is operated by a third-party service provider that provide services that are tangentially related to travel. For example, the third party service provider may provide pet services (e.g., boarding services, pet walker), house sitting services, or babysitting services.

Also shown in FIG. 1 is user 142. The user 142 may be a human user (e.g., a human being), a machine user (e.g., a software program configured to interact with the user device 140), or any suitable combination thereof (e.g., a human assisted by a machine or a machine supervised by human). The user 142 is not part of the network environment 100, but is associated with the user device 140 and may be a user of the user device 140. The user device 140 may be, for example, a desktop computer, a tablet computer, or a smart phone belonging to the user 142.

Any of the servers, databases, or devices (each also referred to as a "machine") shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 6. As used herein, a "database" is a data storage resource and may store data structured as a text file, a table, a spreadsheet, a relational database, a triple store, a key-value store, or any suitable combination thereof. Moreover, any two or more of the machines illustrated in FIG. 1 may be combined into a single machine, and the functions described herein for any single machine may be subdivided among multiple machines.

The network 150 may be any network that enables communication between machines (e.g., the suggestion server 110 and the user device 140). Accordingly, the network 150 may be a wired network, a wireless network (e.g., a mobile network), or any suitable combination thereof. The network 150 may include one or more portions that constitute a private network, a public network (e.g., the Internet), or any suitable combination thereof.

Figure 2:
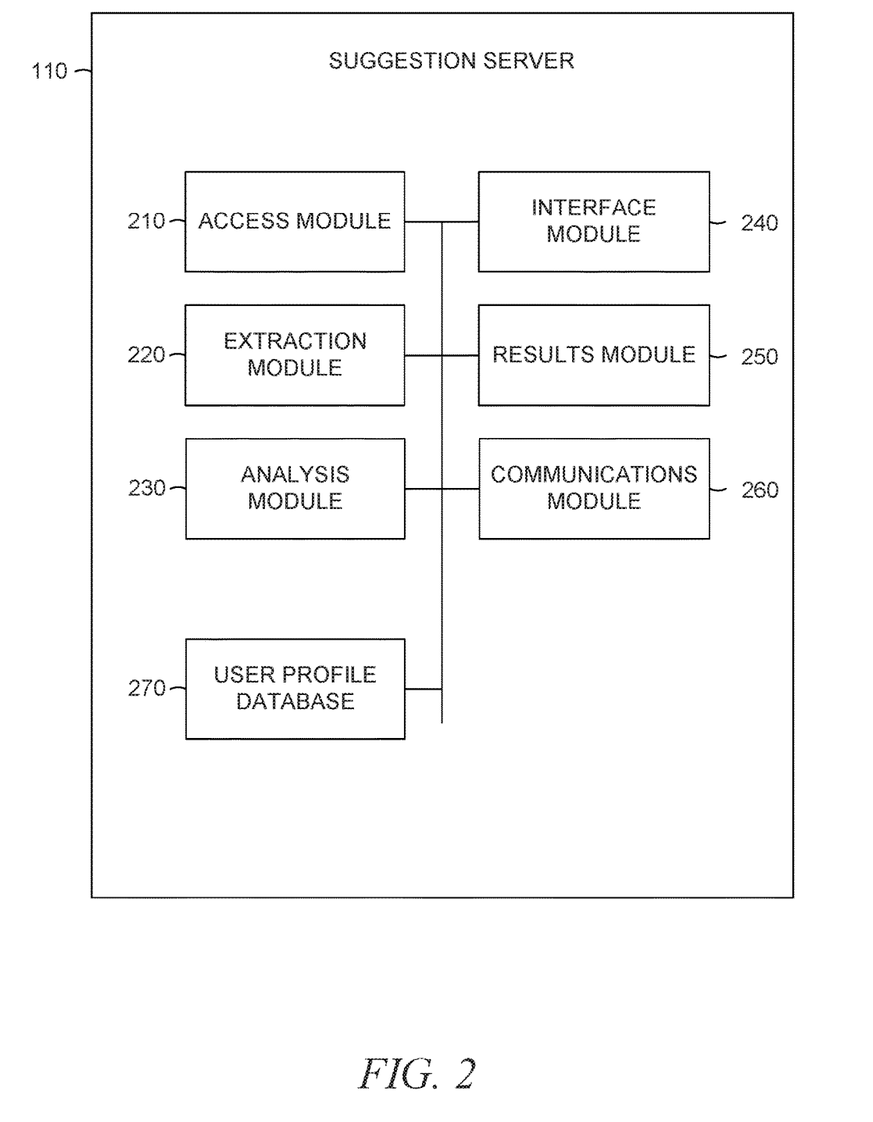
FIG. 2 is a block diagram illustrating components of a suggestion server, according to some example embodiments.

FIG. 2 is a block diagram illustrating components of the suggestion server 110, according to some example embodiments. The suggestion server 110 includes an access module 210, an extraction module 220, an analysis module 230, an interface module 240, a results module 250, and a communications module 260, all configured to communicate with each other (e.g., via a bus, shared memory, or a switch). The suggestion server 110 also includes (or is coupled to) a user profile database 270 that is configured to communicate with the other components of the suggestion server 110. Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The access module 210 is configured to access calendar data of the user 142 (e.g., a traveler, a potential traveler, a consumer of travel options, or a potential consumer of travel options). The access module 210 may access (e.g., receive or retrieve) the calendar data from the calendar server 120, for example, by using an API call. In some example embodiments, the suggestion server 110 locally stores the calendar data (e.g., in the user profile database 270), and the access module 210 accesses the calendar data from the suggestion server 110. The calendar data includes information describing one or more calendared events in the calendar of the user 142 (e.g., scheduled for the user 142). Accordingly, the calendar data indicates a period of time (e.g., first period of time) during which the user 142 is scheduled to participate in (e.g., attend) a calendared event along with a location for the calendared event. For example, the calendar data may indicate that the user 142 is scheduled to attend a dinner at Alinea Restaurant in Chicago on Monday, September 5, from 7 PM to 9 PM Central Time.

The extraction module 220 is configured to extract calendar data that is used to facilitate a search for travel options. In example embodiments, the extraction module 220 parses the calendar data to determine date, time, location, or other (extracted) calendar data that is pertinent for facilitating a search. For example, the extraction module 220 extracts location data (e.g., Alinea Restaurant, Chicago) and time data (e.g., September $5^{th}$, 7 PM to 9 PM). In some example embodiments, the extracted data is provided to the analysis module 230 for processing (discussed further below). In some example embodiments, the extracted data is provided to the interface module 240 and transmitted to service providers (e.g., provider servers 130) via an API call to initiate a search for travel options from the service providers.

The analysis module 230 is configured to determine whether the extracted data indicates one or more calendared events within a single trip or one or more calendared events within multiple trips. Accordingly, the analysis module 230 receives the extracted data and determines whether there are one or more calendared events identified from the extracted data, and if there are a plurality of calendared events, whether the plurality of calendared events are within a predetermined distance threshold and/or time threshold, or triggers a location trigger to constitute a single trip. For example, if a first calendared event is a meeting in Minneapolis and a second calendared event is dinner the next night in St. Paul, this would likely indicate a single trip with multiple events due to the location of the two events being within a predetermined minimum distance threshold (e.g., less than 100 miles) and within a predetermined time threshold (e.g., within 2 days of each other, can be driven in under 3 hours). In another example, if a first calendared event is the meeting in Minneapolis and a second calendared event is dinner three nights later in San Francisco (the user's home location), this indicates a single trip with a single event (i.e., the meeting in Minneapolis) due to the location of the two events exceeding the predetermined minimum distance threshold (e.g., less than 100 miles), being outside of a predetermined time threshold (e.g., more than 2 days apart, cannot be driven in under 3 hours), and/or the second event (i.e., the dinner) being located in the user's home location. The time threshold (e.g., based on time to drive, based on days apart), the distance threshold (e.g., based on distance between calendared events, based on distance from user's home to each calendared event), and the location trigger (e.g., based on one of the calendared events being in a location in between the home location and the other calendared event, based on the home location being in between the location of the two calendared event) may be based on empirical or historical data for the user 142 or for similar users of the suggestion server 110 as determined by the analysis module 230.

In some example embodiments, the analysis module 230 uses a function of both time and distance to determine whether multiple calendared events constitute a single trip or multiple trips. In one example embodiment, two calendared events constitute a single trip if a sum of [a number of minutes of travel time between the locations of the calendared events] and [a distance between the locations of the calendared events in miles] is less than a pre-determined threshold X. In some cases, X may vary as a function of the user's budget, self-declared preferences, or inferred preferences based on prior user behavior. In other example embodiments, multiplication, subtraction, division, exponentials, weighting, or other mathematical operations or combination of operations may be used instead of summation to determine whether two calendared events constitute a single trip.

In another example, if the first calendared event is in San Diego on December $1^{st}$ and the second calendared event is in Boston on January $23^{rd}$ and the user 142 lives in San Francisco, this would likely be categorized by the analysis module 230 as multiple trips. This determination is based on one or more of the time threshold (e.g., the calendared events are more than a month apart), home location of the user 142, a distance threshold (e.g., San Diego and Boston are more than 500 miles apart), or past travels by the user 142 (e.g., the user 142 typically books these trips separately). Further still, the analysis module 230 can base the determination on empirical data from other users' calendars with similar demographics (e.g., other people have booked similar itineraries as separate trips).

In another example, if the first calendared event is in New York City (NYC) on Dec. $1^{st}$ and the second calendared event is in Washington D.C. (DC) on December $3^{rd}$ and the user 142 lives in San Francisco, this would likely be categorized as a single trip with multiple events whereby the user travels to NYC and then to DC as one continuous trip (before flying back to San Francisco) but attends two different events (e.g., one in NYC and one in DC) since it may not make sense for the user 142 to fly back and forth to the two events separately. This determination may be based on the time threshold (e.g., the calendared events are 2 days apart, the distance can be driven in under 5 hours), a location threshold (e.g., NYC and DC are less than 300 miles apart), home location of the user 142 (e.g., home location more than 500 miles from each calendared event, home location not located between the two calendared events), past travels by the user 142, and empirical data from other users' calendars (e.g., people from the West Coast who have one meeting in one East Coast city and one meeting two days later in another East Coast city usually do both as part of one trip rather than two separate trips). As an alternative example, if the user 142 lives in Philadelphia instead of San Francisco, the home location (e.g., Philadelphia) along with empirical data may cause the analysis module 230 to conclude that the user 142 will make two trips and return home between the two trips (e.g., based on the home location being located in between the two calendared events).

In another example, if the first calendared event is lunch in New York City (NYC) on December $1^{st}$ and the second calendared event is dinner in London on December $2^{nd}$ and the user 142 lives in San Francisco, this may be categorized by the analysis module 230 as a single trip with multiple events whereby the user travels to NYC and then London as one continuous trip (before flying back to San Francisco) but attends two different events (e.g., one in NYC and one in London) in some circumstances. In this example, the determination that it is a single trip is inferred by the analysis module 230, which determines that there simply does not exist any flights that would permit the user 142 to stop in San Francisco in between attending both the NYC and London events. In other words, the determination of whether multiple events constitute a single trip may be inferred by assumptions using the user's preferences or by an understanding that travel schedules simply do not permit two events to be anything other than part of a single trip or, alternatively, multiple trips.

The analysis module 230 is also configured to analyze the extracted data to infer a level or type of service that may be applicable to the user 142. Returning to one of the examples above, the analysis module 230 receives the name of the restaurant (e.g., Alinea) and determines that the restaurant is a high-end, expensive restaurant (e.g., based on information retrieved regarding the restaurant). Based on this determination, the analysis module 230 infers that the user 142 is likely very affluent, traveling on an expense account, or prefers a higher level of service. This determination may be used to customize search criteria for the travel options or used to rank results from the search. The inferred level or type of service for the user 142 may be stored in a profile of the user 142 in the user profile database 270.

The analysis module 230 is further configured to infer user preferences from past calendared events. For example, if the user has stayed at a Hilton Hotel for the last four trips, the analysis module 230 infers that the user prefers to stay at Hilton Hotels. In another example, if the user is new, the analysis module 230 can detect that the last five flights from their calendared events were on American Airlines, so the analysis module 230 infers that the user is loyal to American Airlines. As another example, if the analysis module 230 detects that the user 142 tends to "cut it close" and book flights that depart very shortly after a prior meeting, the analysis module 230 infers that flights that leave soon after meetings should be provided to the user even though most other customers would not want to see these flights. As a further example, the analysis module 230 can detect that the user 142 tends to stay at hotels very close to meetings and infer that the user 142 likes to be within walking distance so as not to rent a car. Conversely, the analysis module 230 may detect that the user 142 tends to stay at hotels far from meetings and that the user 142 is therefore willing to rent a car if it will save money on hotels or if the user 142 can stay at a nicer hotel. Further still, if the user 142 takes frequent trips to a particular location (e.g., London), this information can be provided in the API call/request so that the service providers know to offer extra amenities to secure the user's long-term loyalty on future trips to that location. The inferred preferences for the user 142 may be stored in the profile of the user 142 in the user profile database 270.

The interface module 240 is configured to communicate via an API with one or more provider servers 130. In some example embodiments, the interface module 240 provides some or all of the extracted data directly to the provider server 130 (e.g., in fields of an API request). The provider server 130 then performs a search of their inventory for travel options that match at least part of the extracted data. Depending on the capability of the provider server 130, results of the search may be customized to a type or level of service that would appeal to the user 142 or to a user type of the user 142 (e.g., affluent traveler, budget traveler, business traveler, traveler with kids) and may include specific types of discounts, upgrades, or extra amenities that would appeal to the user 142. Upgrades and extra amenities can be up to the service providers and their provider server 130 to provide, or the suggestion server 110 (e.g., the analysis module 230) can provide suggestions to the provider server 130. For example, the suggestion server 110 may indicate that the user 142, based on history of the user 142 or similar type of user, is most likely to pick an option if it includes free breakfast. As such, the logic can be left to the provider server 130 to customize the results, or the suggestion server 110 can provide guidance to the provider server 130 and the provider server 130 can use the guidance. For provider servers 130 that do not include sophisticated search systems, the results may be general results that any user of the provider server 130 may receive using a standard API of the provider server 130.

The results module 250 is configured to determine best or optimal travel options to present to the user 142. The best travel options may be based on a combination of one or more factors such as cost, what the user 142 is getting (e.g., free breakfast, suite vs. room, free WiFi), customer reviews including customer reviews specific to this user's demographics, user preferences (e.g., from the user profile database 270), an inferred user type or level of service (e.g., from the analysis module 230 or user profile database 270), and commission levels for an owner of the suggestion server 110. The user preferences can be explicitly provided by the user 142 (e.g., user 142 previously fills out a form or user interface that indicates preferences for airlines, times for flights, hotels, or room types that is stored to the user profile database 270). The user preferences can also be inferred from past purchases or calendared events as discussed above with respect to the analysis module 230.

In some example embodiments, the results module 250 comprises an algorithm that applies weights and scores to these factors. For example, if the calendar data indicates that the user 142 is attending an event with his two children, the results module 250 may weigh a stay at kid-friendly hotel with free video games and a highly rated swimming pool higher. As another example, if the calendar data indicates that the user 142 is attending an event with wealthy business clients, the results module 250 may weigh a stay at a high-end luxury hotel with sophisticated conference facilities higher. As a further example, if the calendar data indicates that the user 142 is attending an event with his wife near their wedding anniversary date, the result module 250 may weigh a stay at a romantic bed-and-breakfast inn near the event higher.

In some example embodiments, the results module 250 assigns extra weight to a service provider or travel option that is providing something unique to the user 142 (e.g., lower rate than a public rate). Whether a travel option contains a unique aspect can be determined in several ways. For example, the suggestion server 110 can directly query the provider server 130 if the provider server 130 is providing a unique benefit to the user 142. Alternatively, the suggestion server 110 (e.g., the interface module 240) can perform multiple API calls for search results. A first API call is made via a special API to the provider server 130 that results in the customized search results for the user 142 being returned. A second API call is made using a standard API (e.g., available to the general public) of the provider server 130 that results in standard search result. The results module 250 then compares the travel options from the two search results to determine whether and what the unique amenities or benefits are. In some example embodiments, the unique amenities and benefits may be weighted differently. For example, a free room upgrade may be weighted higher than free breakfast or free WiFi. In some example embodiments, the results module 250 comprises or accesses logic or stored data (e.g., weight table stored in memory) that indicates a weight to apply.

The communications module 260 is configured to present the travel options to user. The communications module 260 may present the travel options by generating and displaying or causing the display of a user interface or webpage (e.g., of a travel option search service), a notification (e.g., a pop up window), a message (e.g., an e-mail message, instant message, or a text message), or any suitable combination thereof. In some example embodiments, the communication module 260 presents the travel options in a communication directed at the user 142, in a communication addressed to the user device 140, or both (e.g., for consideration by the user 142). The communication (e.g., the notification or message) may include a link to a user interface (e.g., provided by a website associated with the suggestion server 110) comprising the travel options to be presented to the user.

The user profile database 270 stores user profile information of the user 142 for access by components of the suggestion server 110. The user profile information may include, for example, home location (e.g., home address, home airport), inferred and explicitly provided user preferences (e.g., prefers 5 star hotels, prefers high floors away from elevators, prefers business class seats, prefers driving instead of flying if a trip is less than 100 miles), service provider membership information (e.g., airline frequent flier number, hotel loyalty membership number), or inferred user type.

Figure 3:
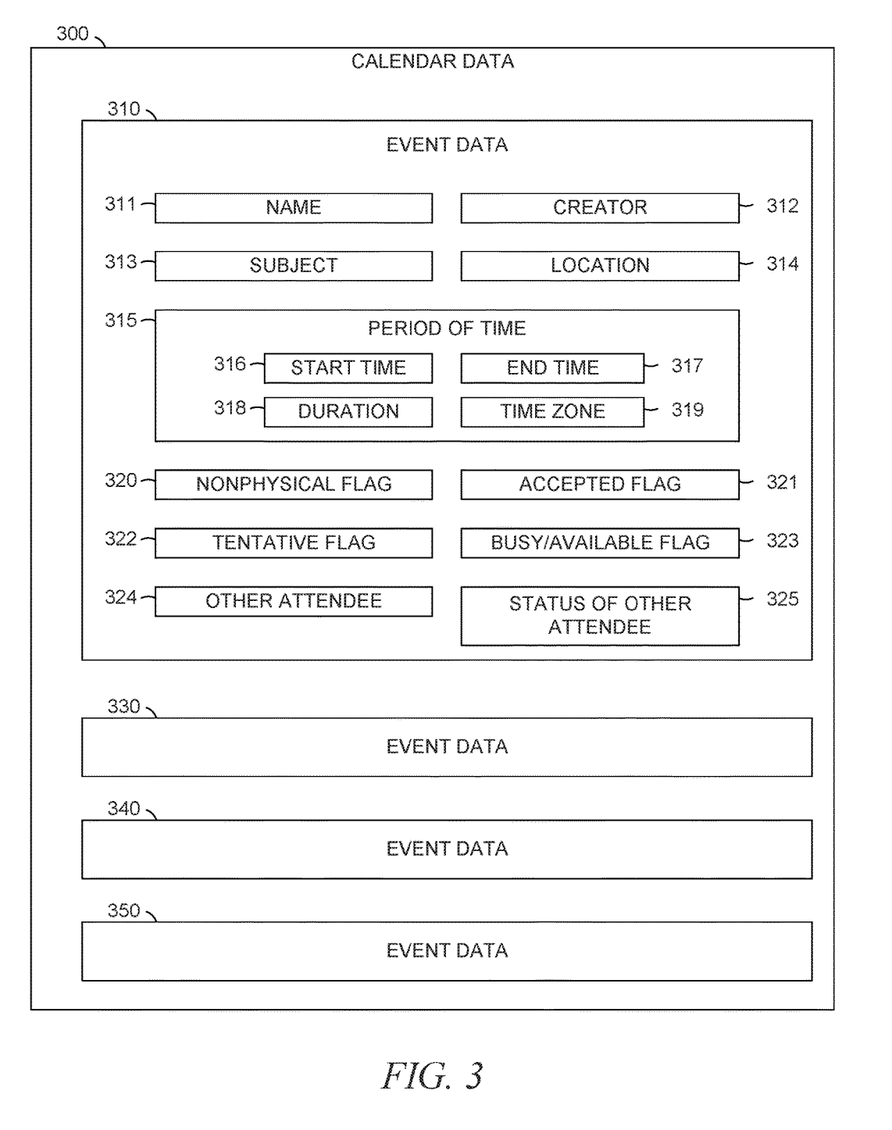
FIG. 3 is a block diagram illustrating calendar data accessed by the suggestion server, according to some example embodiments.

FIG. 3 is a block diagram illustrating calendar data 300 (e.g., as accessed by the access module 210), according to some example embodiments. The calendar data 300 includes information describing one or more events. As shown, event data 310 describes a calendared event (e.g., a phone call, a business meeting, a multi-day conference, a week-long vacation, dinner reservations, or sports events). Similarly, event data 330, 340, and 350 describe additional calendared events (e.g., each event having its own location). The calendar data 300 may be limited to events of a single user (e.g., user 142). According to various example embodiments, one or more of the following data structures may be omitted.

The event data 310 includes a name 311 of an event (e.g., a title), a creator 312 of the event (e.g., the user 142 or an assistant thereof), a subject 313 of the event (e.g., a description or note), and a location 314 of the event (e.g., room number, floor number, venue name, address, city, state, country, cross streets, or global positioning system (GPS) coordinates). The event data 310 also includes a period of time 315 for the event. The period of time 315 includes a start time 316 (e.g., 10 AM), an end time 317 (e.g., 12 PM), a duration 318 (e.g., two hours), and a time zone 319 (e.g., Eastern Time). In some example embodiments, the period of time 315 includes multiple time zones (e.g., time zone 319). According to various example embodiments, the event data 310 includes a nonphysical flag 320 (e.g., indicating that the event is a virtual or online event), an accepted flag 321 (e.g., indicating that the event has been accepted into the calendar of the user 142), a tentative flag 322 (e.g., indicating that the event is tentatively scheduled for the user 142), and a busy/available flag 323 (e.g., indicating whether the user 142 is busy or available for additional events during the period of time 315). Moreover, in some example embodiments, the event data 310 includes information on one or more additional attendees. As shown, the event data 310 includes an "other" attendee 324 of the event (e.g., a name of another attendee) and a status 325 of the other attendee (e.g., whether the other attendee 324 is scheduled to attend the event). In various example embodiments, the other attendee 324 is a friend, family member, coworker, colleague, or a client of the user 142. In certain example embodiments, multiple "other" attendees are specified in the event data 310. Each of the event data 330, 340, and 350 may include information similar to that described for the event data 310.

Figure 4:
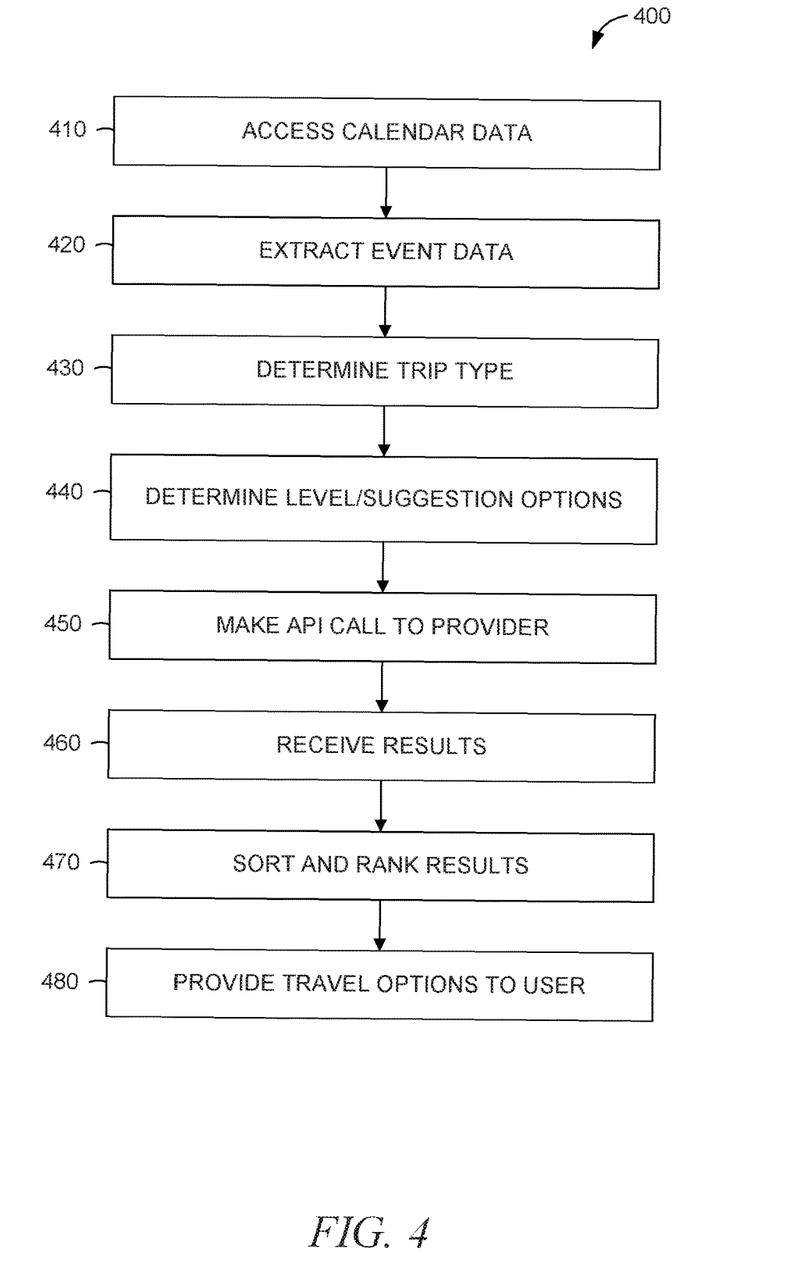
FIG. 4 is a flowchart illustrating operations of a method for providing calendar-based suggestions of single user, single event travel options, according to some example embodiments.

FIG. 4 is a flowchart illustrating operations of a method 400 for causing presentation of calendar-based suggestions of single user, single event travel options, according to some example embodiments. Operations in the method 400 may be performed by the suggestion server 110, using modules described above with respect to FIG. 2. Accordingly, the method 400 is described by way of example with reference to the suggestion server 110. However, it shall be appreciated that at least some of the operations of the method 400 may be deployed on various other hardware configurations or be performed by similar components residing elsewhere in the network environment 100. Therefore, the method 400 is not intended to be limited to the suggestion server 110.

In operation 410, the access module 210 accesses the calendar data 300 (e.g., from the calendar server 120). The calendar data 300 is specific to the user 142. Moreover, the calendar data 300 may indicate the period of time 315 (e.g., a first period of time) during which the user 142 is scheduled to participate in an event (e.g., a business meeting). In some example embodiments, operation 410 is performed by invoking an application programming interface (API) (e.g., a public API) provided by a third-party calendar service (e.g., Google) to access the calendar data 300 of the third-party calendar service. For example, the API may be invoked in response to the user 142 providing login credentials (e.g., username and password) to identify or authenticate himself to the suggestion server 110, to the calendar server 120, to the provider server 130, or any suitable combination thereof. In certain example embodiments, operation 410 is performed by receiving the calendar data 300 from the calendar server 120. As an example, the calendar data 300 may be received from the calendar server 120 in response to a request submitted by the user 142 to the calendar server 120. As another example, the calendar data 300 may be received from the calendar server 120 as part of a data feed (e.g., a periodic or repeating download) arranged or authorized by the user 142. According to some example embodiments, operation 410 is performed in response to a query submitted by the user 142 (e.g., via the user device 140) to the suggestion server 110 or another server associated with (e.g., linked to) the suggestion server 110, such as a server hosting a search engine. For example, the user 142 may query the name of a city (e.g., San Francisco or New York City), and the access module 210 may access the calendar data 300 in response to the submission of the query (e.g., as detected by the suggestion server 110, the calendar server 120, the provider server 130, or any suitable combination thereof).

In operation 420, the extraction module 220 extracts event data 310 from the calendar data. The extracted data is then used to facilitate a search for travel options. For example, the extraction module 220 may extract event type or subject 313 (e.g., meeting, dinner), location 314 (e.g., Alinea, Chicago), and time data (e.g., start time 316, end time 317, duration 318). In some example embodiments, the extracted data may be for one or more events over a predetermined date range (e.g., 2 week period).

In operation 430, the analysis module 230 determines a trip type (e.g., single trip with a single event, single trip with multiple events, or multiple trips). Accordingly, the analysis module 230 determines whether there are one or more calendared events identified by the extracted data, and if there are a plurality of calendared events, whether the plurality of calendared events are within, for example, a predetermined distance threshold, a predetermined time threshold, or both, or triggers a location trigger. Operation 430 will be discussed in more detail in connection with FIG. 5.

In operation 440, the analysis module 230 analyzes the extracted data to infer a level of service and user type that may be applicable to the user 142. For example, if the analysis module 230 determines that the user 142 is having dinner at a high-end, expensive restaurant (e.g., based on information retrieved regarding the restaurant), the analysis module 230 may infer that the user 142 is likely very affluent, traveling on an expense account, or prefers a higher level of service or options. This determination may be used to customize search criteria, suggest amenities or other options for the travel options, or rank results from the search performed by the service provider(s). In some example embodiments, operation 440 may occur at any time given any calendared data and the results stored to the user profile database 270. As such, operation 440 may include accessing stored inferred level of service or user type information for the user 142 (e.g., from a user profile stored in the user profile database 270).

In operation 450, the interface module 240 generates an API request using the extracted data and makes an API call to one or more provider servers 130. The interface module 240 may include user preferences or preferences of other similar users in the API request including an inferred or explicit level of service or an inferred or explicit user type. In example embodiments, the API request is automatically generated based on the determined trip type. For example, if the trip type is a single event trip for only the user, the API request will include the extracted data for the single event. However, if the trip type is a single trip with multiple events, the API request may include extracted data for the multiple events, which may result in a different set of returned travel options versus a trip type for a single event trip (e.g., a hotel in between the different events versus a hotel near the single event).

In some example embodiments, rather than simply calling the service provider's standard API, the interface module 240 provides additional data to a special API of the service provider. The additional data can be just indicating to the special API that the user 142 is a member associated with the suggestion server 110 to providing more sophisticated information (e.g. indicating to the special API that the customer's last meeting of the day is at 9 PM on the Upper East Side of Manhattan). As such, the interface module 240 can provide some or all of the extracted data, via a special API, to a provider server 130 that has logic to handle customized searches based on the extracted data. For example, the provider server 130 is provided the location, time data, type or level of service for the user 142, and suggested options (e.g., this type of user prefers free breakfast), and is capable of returning customized results.

In addition, the interface module 240 (in the API call) can include recommendations on what discounts or extra amenities the service provider should offer to maximize their likelihood of getting a booking. In some example embodiments, the interface module 240 suggests a threshold discount or extra amenities in the API call (e.g. "only give us results that are discounted at least 20%," "only give us results that include free upgrades," or "you're twice as likely to be booked if your discount is more than 20%") to motivate service providers to do so. Alternatively, the interface module 240 uses a standard API of a provider server 130 that does not have a special API and provides appropriate search criteria to the provider server 130 (e.g., general date and location information).

In operation 460, the results module 250 receives the results. Depending on the capability of the provider server 130, results of the search may be customized to the type or level of service that would appeal to the user 142 or to user type of the user 142 (e.g., affluent traveler or budget traveler) and may include specific types of discounts, upgrades, or extras that would appeal to the user 142, and can include options (e.g., upgrades and extras) suggested by the suggestion server 110 (e.g., by the interface module 240 in the API request). For example, a service provider with a special API can return a different set of inventory or travel options versus a general API (e.g., 10 hotels on the Upper East Side rather than 10 hotels spread all around New York). In another example, the service provider returns the same inventory as with a standard API, but with discounts or other amenities (e.g., free upgrades, free breakfast) not available to the public at large. Service providers may be eager to offer discounts to segmented groups of customers (e.g. mobile-only rates for customers dining at high-end restaurants before their stay), because it permits the service provider to price-discriminate or fill up inventory the service provider would not have otherwise been able to sell without "diluting their brand" by offering public discounts. For service providers that do not have sophisticated search systems, the results may be general results that any user would receive using the standard API of the service provider.

In operation 470, the results module 250 sorts and ranks the results to determine the best or most optimal travel options to present to the user 142. The best travel options may be based on a combination of one or more factors such as, for example, cost, what the user 142 is getting (e.g., free breakfast, suite vs. room, free WiFi), customer reviews including customer reviews specific to this user's demographics, user preferences (e.g., from the user profile database 270), the inferred user type and level of service (e.g., from the analysis module 230), or commission levels for an owner of the suggestion server 110. In some example embodiments, the results module 250 uses an algorithm that applies weights and scores to these factors. In some example embodiments, the results module 250 assigns extra weight to a service provider or travel option that provides a unique benefit or aspect to the user 142 (e.g., lower rate than a public rate).

In some example embodiments, results from the standard API call are cross-referenced against a pre-provided list of discounts or extras. For example, each week an airline may provide a list of how much discount flights provided by the suggestion server 110 can be offered as a function of the route or a particular type of user (e.g., affluent user, frequent flier). In another example, a hotel company provides a list of upgrades that can be provided for free to customers of the operator of the suggestion server 110 going to specific cities. The suggestion server 110 (e.g., the results module 250) can then automatically apply these discounts/upgrades to the standard search results if conditions/rules for these discounts/upgrades are satisfied. These discounts/upgrades can then be taken into consideration by the results module 250 in ranking the travel options.

In yet some example embodiments, the operator of the suggestion server 110 can include their own discounts or extras. For example, the suggestion server 110 may use models to estimate how likely a specific user would be to book at various prices for a hotel (e.g. based on other people whose calendars have had meetings in similar cities), and then apply discounts tailored to those prices on top of what the service providers offers. In some example embodiments, the suggestion server 110 can also offer customers extra discounts, for example, for purchasing flights and hotels together. The suggestion server 110 can also solicit extra-discounted inventory or extra-special offers, from the service providers, for users willing to book flights and hotels together.

In operation 480, the communications module 260 presents the travel options to the user 142. The communications module 260 may present the travel options by displaying or causing a display of a user interface such as a webpage (e.g., of a travel option search service), a notification (e.g., a pop up window), a message (e.g., an e-mail message, instant message, or a text message), or any suitable combination thereof. More than one means of presenting the results (e.g., user interface, notification, message) can be used. In some example embodiments, the communication module 260 presents the travel option in a communication (e.g., a notification or message) directed at the user 142, in a communication addressed to the user device 140, or both. Such a communication may present the travel option among multiple travel options (e.g., for consideration by the user 142), or provide a link to a webpage or website where a user interface comprising the travel options is presented. In some example embodiments, the communications module 260 presents a top number of travel options (e.g., the top 3) as determined in operation 470. In other example embodiments, the communications module 260 present all the travel options along with recommendations of the best travel options.

While example embodiments discuss the options as being travel options, example embodiments are not limited to travel service providers. The service provider can be any service provider that wants to know particular travel information for the user 142 and use that travel information to offer services. For example, the service provider can be an entertainment venue (e.g., for a location that the user 142 will be at during a trip), restaurant, a travel insurance company, house sitters, pet boarding service, and so forth.

Figure 5:
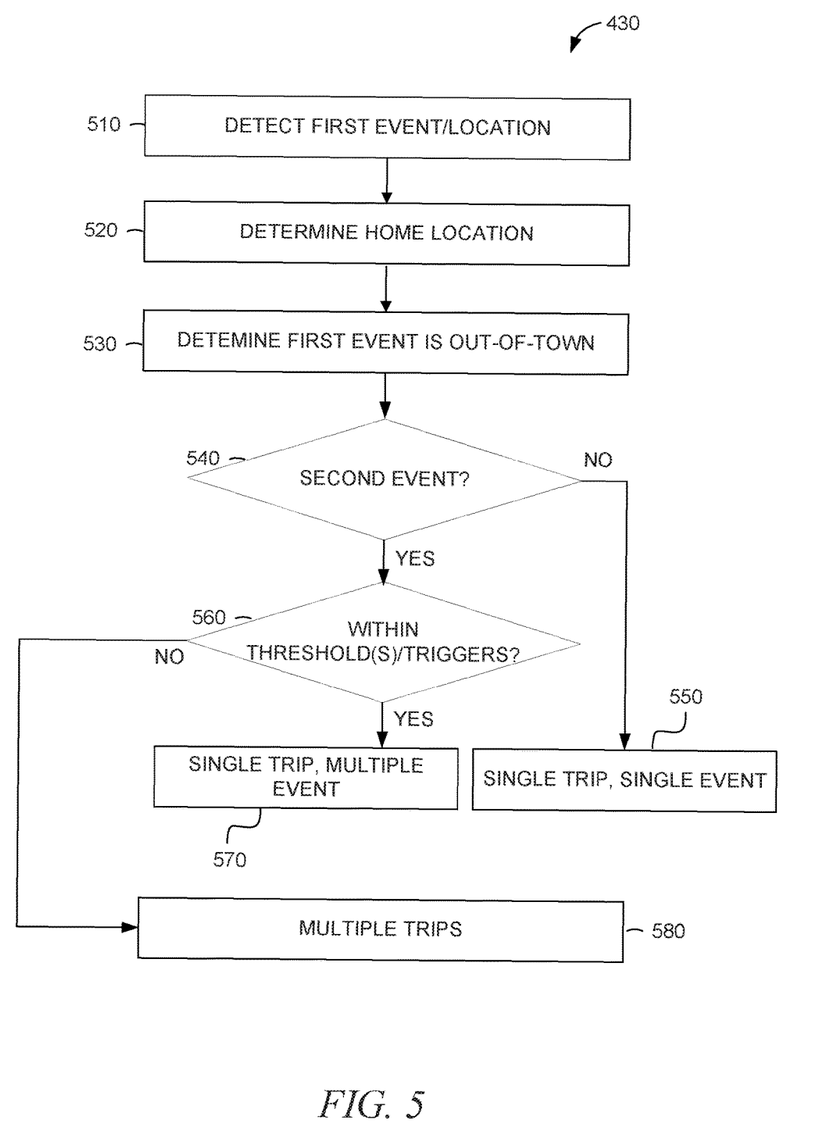
FIG. 5 is a flowchart illustrating operations of a method for determining a trip type, according to some example embodiments.

FIG. 5 is a flowchart illustrating operations of a method (e.g., operation 430) for determining a trip type, according to some example embodiments. Operations in the method may be performed by the suggestion server 110, using one or more modules (e.g., the analysis module 230) described above with respect to FIG. 2. Accordingly, the method is described by way of example with reference to the suggestion server 110. However, it shall be appreciated that at least some of the operations of the method may be deployed on various other hardware configurations or be performed by similar components residing elsewhere in the network environment 100. Therefore, the method is not intended to be limited to the suggestion server 110.

In operation 510, the analysis module 230 detects a first calendared event and corresponding location 314 and time from the extracted data. The analysis module 230 then access a home location for the user 142 in operation 520. The home location may be accessed from the user profile of the user 142 stored in the user profile database 270.

Based on a comparison of the event location 314 and the home location information by the analysis module 230, a determination is made in operation 530 that the first event is an out-of-town event. The determination may be based on the location 314 transgressing a home location distance threshold (e.g., more than 100 miles from the home location) or a home location driving time threshold (e.g., more than 3 hours to drive from the home location). In example embodiments, the determination that the first event is an out-of-town event triggers a flag to be set by the analysis module 230 that indicates to the interface module 240 that an API request is to be generated.

In operations 540, the analysis module 230 determines whether the extracted data indicates there is a second calendared event. In some example embodiments, the analysis module 230 determines whether there is a second calendared event within a predetermine time range of the first calendared event (e.g., within a week). If there is not a second calendared event, then the analysis module 230 concludes that the trip is a single trip with a single event in operation 550.

However, if there is a second calendared event detected, then in operation 560, the analysis module 230 determines whether the first and second calendared events are within one or more event thresholds or satisfies an event trigger (e.g., time threshold, distance threshold, location trigger). If the two events are within the event thresholds/triggers, then the analysis module 230 may conclude that the user 142 has a single trip with multiple events in operation 570. For example, if the location of the first event and the location of the second event are closer to each other than to the user's home and the events are less than a two days apart, the analysis module 230 concludes that the user 142 has a single trip with multiple events. In another example, if the home location is between the two calendared events, the analysis module 230 may infer that there are two trips based on a location trigger being satisfied (e.g., home location between the two calendared events and the user will likely return home in between the two calendared events).

If in operation 560, the analysis module 230 determines that the two events are not within the time threshold or a distance threshold or does not satisfy a location trigger (e.g., home location between the two calendared events, location of one event in between home location and other event), or any combination of these thresholds/triggers, then the analysis module 230 infers that the user 142 has multiple trips in operations 580. Various methods for determining whether two calendared events constitute a single trip or multiple trips were discussed above with respect to FIG. 2. The type of trip may affect the type and number of API calls to make to the provider server in operation 450 of FIG. 4. Operations 540 and 560 may be repeated if more than two calendared events are detected.

As an extension of some example embodiments, the suggestion server 110 can suggest an add-on trip to an inferred trip. For example, if the user 142 who lives in New York has a calendared event (e.g., meeting) in San Francisco on a Friday, the suggestion server 110 may suggest a weekend extension add-on trip to Napa or Monterey or an extension to the San Francisco trip. As such, the interface module 240 constructs an API request for specific deals (e.g., obtain travel options) for dates corresponding to the weekend. Further still, in addition to suggesting an add-on trip, the suggestion server 110 may suggest add-on events (e.g., concerts or restaurants) that may be of interest to the user, for example, based on their preferences. In some example embodiments, the add-on trip can be included in the API request for bundled travel options.

According to various example embodiments, one or more of the methodologies described herein may facilitate communication of information about one or more travel options. In particular, one or more of the methodologies described herein may constitute all or part of a method (e.g., a method implemented using a machine) that generates and presents user interfaces of available travel options determined to be compatible with a single event during a single trip. Moreover, presentation of such travel options may be conveniently integrated with calendar information, which may facilitate the making of travel plans.

When these effects are considered in aggregate, one or more of the methodologies described herein may obviate a need for certain efforts or resources that otherwise would be involved in matching users (e.g., as potential consumers of travel options) with travel options that are likely to be of interest to those users. Efforts expended by a user in identifying a travel option may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 6:
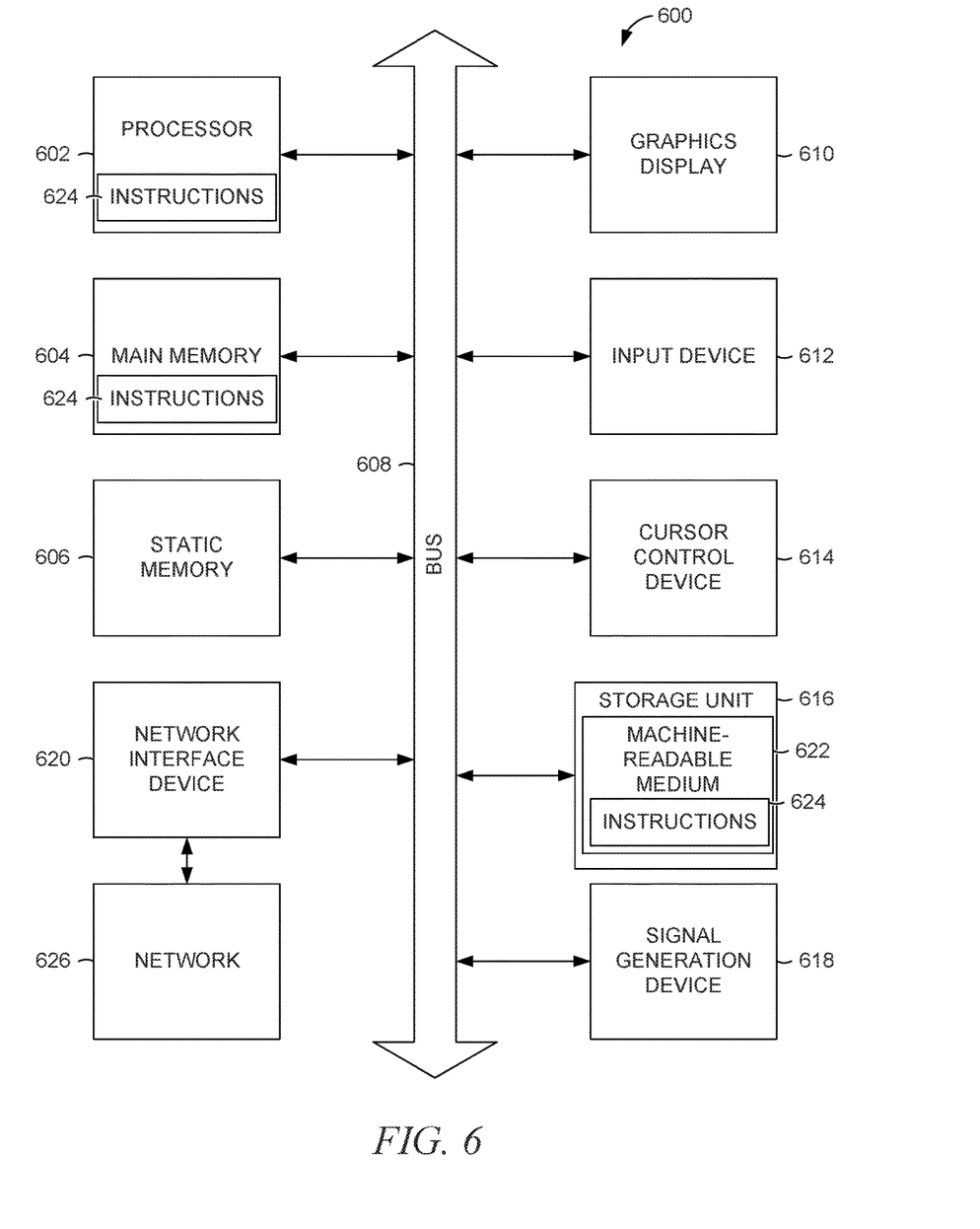
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIGS. 4 and 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 (e.g., network 150) via the network interface device 620.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium, or combination of multiple media, that is capable of storing instructions (e.g., software) for execution by the machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 622 is non-transitory in that it does not embody a propagating or transitory signal. However, labeling the machine-readable medium 622 as "non-transitory" should not be construed to mean that the medium is incapable of movement—the medium should be considered as being transportable from one physical location to another. Additionally, since the machine-readable medium 622 is tangible, the medium may be considered to be a tangible machine-readable storage device.

In some example embodiments, the instructions 624 for execution by the machine 600 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 624)

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
accessing calendar data of a user, the calendar data indicating an event that the user is scheduled to attend, the event being a last event of a day;
extracting, by a hardware processor, location data for the last event of the day from the calendar data;
determining, from the extracted location data, that a geographical distance or a driving time between the last event of the day and a home address of a home of the user exceeds a threshold value that indicates the last event of the day is out-of-town;
determining, from the extracted location data, that the last event of the day is at a building associated by a suggestion server with a corresponding affluence level among a set of multiple affluence levels;
in response to the last event of the day being out-of-town, automatically constructing an application program interface (API) request for accommodation options associated by the suggestion server with the affluence level of the building at which the last event of the day is scheduled, the API request including the affluence level of the building and the extracted location data for the last event of the day;
transmitting, over a network, the API request to a provider server of at least one service provider;
in response to the transmitting, receiving results from the provider server of the at least one service provider, the results comprising accommodation options associated by the suggestion server with the affluence level of the building at which the last event of the day is scheduled; and
causing presentation of at least some of the accommodation options associated by the suggestion server with the affluence level of the building.

2. The method of claim 1, wherein the causing presentation comprises:
generating a user interface comprising at least some of the accommodation options from the results; and
causing the user interface to be displayed on a device of the user.

3. The method of claim 1, wherein the causing presentation comprises transmitting a notification or a message to the device of the user, the notification or message providing a link to access a user interface comprising at least some of the accommodation options from the results.

4. The method of claim 1, further comprising determining that a trip type associated with the event is a single event, single user trip type, the determining comprising detecting that there is no second event in the calendar data within a predetermined time range of the event or that there is no second event transgressing an event threshold or event trigger.

5. The method of claim 1, wherein the extracted location data for the last event of the day comprises one or more of a location of the last event, a type of event, or a time of the last event.

6. The method of claim 1, wherein:
the transmitting of the API request to the service provider is part of transmitting a plurality of API requests to a plurality of different service provides; and
the receiving of the results is part of aggregating results received in response to the plurality of API requests.

7. The method of claim 1, further comprising determining a top number of accommodation options from the results, the determining of the top number being based on preferences of the user or preferences of similar users.

8. The method of claim 1, further comprising inferring preferences for the user from past or current data for events obtained from the calendar data of the user.

9. The method of claim 8, wherein the API request includes the inferred preferences of the user.

10. A machine-readable storage device storing instructions that, when executed by one or more processors of a machine, cause the machine to perform operations comprising:
accessing calendar data of a user, the calendar data indicating an event that the user is scheduled to attend, the event being a last event of a day;
extracting location data for the last event of the day from the calendar data;
determining, from the extracted location data, that a geographical distance or a driving time between the last event of the day and a home address of a home of the user exceeds a threshold value that indicates the last event of the day is out-of-town;
determining, from the extracted location data, that the last event of the day is at a building associated by a suggestion server with a corresponding affluence level among a set of multiple affluence levels;
in response to the last event of the day being out-of-town, automatically constructing an application program interface (API) request for accommodation options associated by the suggestion server with the affluence level of the building at which the last event of the day is scheduled, the API request including the affluence level of the building and the extracted location data for the last event of the day;
transmitting, over a network, the API request to a provider server of at least one service provider;
in response to the transmitting, receiving results from the provider server of the at least one service provider, the results comprising accommodation options associated by the suggestion server with the affluence level of the building, at which the last event of the day is scheduled; and
causing presentation of at least some of the accommodation options associated by the suggestion server with the affluence level of the building.

11. The machine-readable storage device of claim 10, wherein the operations further comprise ranking the results to determine a top number of accommodation options based on preferences of the user.

12. The machine-readable storage device of claim 10, wherein the extracted location data for the last event of the day comprises one or more of a location of the last event, a type of event, or a time of the last event.

13. The machine-readable storage device of claim 10, wherein:
the transmitting of the API request to the service provider is part of transmitting a plurality of API requests to a plurality of different service provides; and
the receiving of the results is part of aggregating results received in response to the plurality of API requests.

14. The machine-readable storage device of claim 10, wherein the operations further comprise determining a top number of accommodation options from the results, the determining of the top number being based on preferences of the user or preferences of similar users.

15. The machine-readable storage device of claim 10, wherein the operations further comprise inferring preferences for the user from past or current data for events obtained from the calendar data of the user.

16. The machine-readable storage device of claim 15, wherein the API request include the inferred preferences of the user.

17. A system comprising:
one or more hardware processors configured by instructions accessed from a storage device to perform operations comprising:
accessing calendar data of a user, the calendar data indicating an event that the user is scheduled to attend, the event being a last event of a day;
extracting location data for the last event of the day from the calendar data;
determining, from the extracted location data, that a geographical distance or a driving time between the last event of the day and a home address of a home of the user exceeds a threshold value that indicates the last event of the day is out-of-town;
determining, from the extracted location data, that the last event of the day is at a building associated by a suggestion server with a corresponding affluence level among a set of multiple affluence levels:
in response to the last event of the day being out-of-town, automatically constructing an application program interface (API) request for accommodation options associated by the suggestion server with the affluence level of the building at which the last event of the day is scheduled, the API request including the affluence level of the building and the extracted location data for the last event of the day;
transmitting, over a network, the API request to a provider server of at least one service provider;
in response to the transmitting, receiving results from the provider server of the at least one service provider, the results comprising accommodation options associated b the suggestion server with the affluence level of the building at which the last event of the day is scheduled; and
causing presentation of at least some of the accommodation options associated by the suggestion server with the affluence level of the building.

18. The system of claim 17, wherein the operations further comprise ranking the results to determine a top number of accommodation options based on preferences of the user.

19. The system of claim 17, wherein the operations further comprise inferring preferences for the user from past or current data for events obtained from the calendar data of the user.

20. The system of claim 19, wherein the API request include the inferred preferences of the user.

* * * * *